SELF-THREADING TAPE MECHANISM

Filed March 9, 1962 2 Sheets-Sheet 1

Paul F. Hayner
Edgar R. Bernier
Kenneth E. Mayo

INVENTORS

Paul F. Hayner
Edgar R. Bernier
Kenneth E. Mayo

*INVENTORS*

3,190,575
SELF-THREADING TAPE MECHANISM
Paul F. Hayner, Lexington, Mass., and Edgar R. Bernier and Kenneth E. Mayo, Nashua, N.H., assignors to Sanders Associates, Inc., Nashua, N.H., a corporation of Delaware
Filed Mar. 9, 1962, Ser. No. 178,667
8 Claims. (Cl. 242—55.13)

This invention relates to an improvement in magnetic tape tranport mechanisms and more particularly to a self-threading mechanism for magnetic tape.

Heretofore, self-threading has been deemed desirable for tape recorders, and extensive work has been done in attempting to achieve self-threading mechanisms which are reliable and which do not require an extensive departure from existing tape transport designs. However, the task of designing a reliable self-threading mechanism for tape recorders has been fraught with difficulties which are especially acute in the case of airborne recorders where tape cartridges often must be replaced under adverse situations and where accessibility is limited as a result of maximum utilization of space. Some of the difficulties attendant to the problem of designing a reliable self-threading mechanism for tape recorders stem from the fact that magnetic tape is very thin and flexible and does not support itself in the manner of motion picture film. Still other difficulties stem from the fact that the magnetic tape cannot be distorted physically or have attached to it any bulky or inflexible element which may impose restrictions on the speed with which it is transported past the recording and erase heads or which may interfere with the quality of the recording or with the playback of information on the tape. Moreover, reliability of the self-threading system is essential, being especially critical where the recorder is to record or monitor information of a single occurrence character. A suitable example is the case of a recorder monitoring radio talk between an airport control tower and airborne aircraft. Should the recorder fail to record the desired information, it would be lost forever and with possible irreparable damage, as, for instance, where the recorded information would have provided the sole unobjective explanation to an in-flight collision between two aircraft.

Accordingly, the object of the present invention is to provide a reliable self-threading mechanism for a magnetic tape transport.

A more comprehensive objective of the present invention is to provide a magnetic tape recorder having a system for automatically threading tape from a detachable tape magazine. In order to attain this objective, the self-threading system embodies two flexible coupling elements, one of which is attached to the lead end of tape in a removable tape cartridge, the two coupling elements having complementary hooked ends which coengage each other so as to lock the tape in the cartridge to the permanent leader. The system also embodies means for assisting the coupling element on the permanent leader to engage the coupling element on the lead end of the tape in the cartridge after the cartridge is installed in the recorder.

A further object of the present invention is to make possible a magnetic recorder wherein a tape cartridge may be loaded onto a spindle, its tape transferred to and back from a storage reel, and then the cartridge removed, all without need for the operator touching the tape of said cartridge.

Other objects and many of the attendant advantages of the present invention will be readily appreciated as the invention becomes better understood by reference to the following detailed description when considered in connection with the accompanying drawings wherein.

Figure 1:
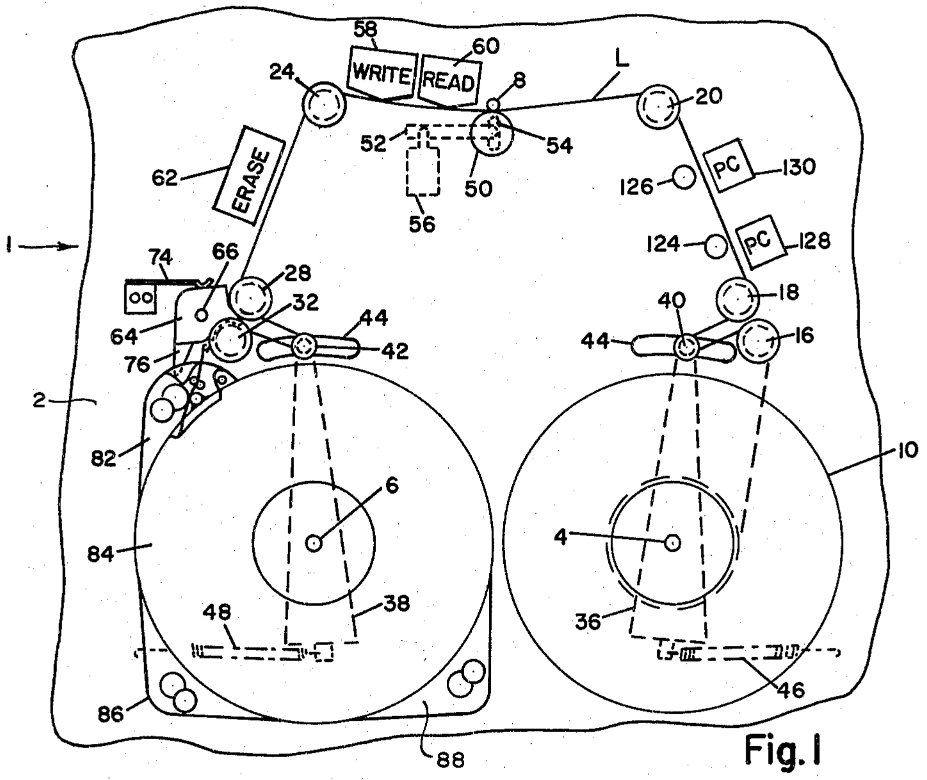
FIG. 1 is a fragmentary plan view of a tape transport mechanism and a tape cartridge embodying the present invention.

Turning now to FIG. 1, the illustrated apparatus comprises a tape transport mechanism 1 having a top wall 2 through which project two spindles 4 and 6 and a capstan 8. Spindles 4 and 6 are driven in association with a capstan 8 from a conventional reversible drive means mounted on the underside of top wall 2. Details of construction of the drive means are omitted since they form no part of the present invention and since various conventional drive means may be utilized with equal effect. However, the drive means is represented in the block diagram of FIG. 8.

The spindle 4 carries a storage reel 10 having a permanent leader L attached thereto. The leader L may be made of any suitable flexible material, preferably of Mylar or one of the other materials conventionally used as the base of magnetic tape. Preferably also, the leader is substantially opaque. The tape bed further includes a plurality of fixed guide rolls 16, 18, 20, 24, 28, and 32 mounted on top of the top wall 2 which define a path to be followed by the leader L and by a magnetic tape attached to the leader in the manner hereinafter described. Also forming part of the tape bed are two arms 36 and 38 which are rotatably mounted on the spindles 4 and 6 on the underside of top wall 2 and which are provided at corresponding ends with rollers 40 and 42 respectively which are disposed above top wall 2 in coplanar relation with rollers 16–32. In this connection, it is to be observed that rollers 40 and 42 are mounted on stub shafts which pass through arcuate slots 44 in top wall 2. Attached to the opposite ends of the arms 36 and 38 are identical springs 46 and 48 which are anchored to the underside of top wall 2. Springs 46 and 48 urge the arms 36 and 38 in counterclockwise and clockwise directions, respectively, as viewed in FIG. 1, away from the rolls 16, 18, and 28, 32, whereby the rollers 40 and 42 will maintain tension on the leader L and the connected tape as the latter move past the various guide rolls to and from the supply reel 10.

Associated with the capstan 8 is a pinch roll 50 which is mounted on one end of a pivoted lever arm 52. The lever arm 52 is pivotally connected to the underside of top wall 2 and the pinch roll 50 is attached to arm 52 by a stub shaft which projects through a slot 54 in top wall 2. Connected to the opposite end of lever arm 52 is the armature of a solenoid 56 which also is secured in place below top wall 2. When solenoid 56 is energized, its armature will pivot lever arm 52 so as to force pinch roll 50 toward capstan 8, whereby to press the leader and the tape connected thereto against the capstan so that the latter may drive the leader and tape toward and away from the storage reel 10. Although its electric control system is not shown, it is to be understood that solenoid 56 is energized whenever the recorder is set for recording, or playback, and is de-energized so as to move pinch roll 20 away from capstan 8 when the recording, or playback, operation is completed. Obviously, solenoid 56 may be controlled by a manually or automatically controlled switch, depending upon the particular end use requirements for the recorder.

Located between the capstan 8 and the guide roll 24 are two magnetic heads 58 and 60, the former adapted to record information and the latter adapted to play back information. Located between the guide rolls 24 and 28 is a conventional erase head 62 which, on suitable signal, will function to erase information on tape moving past it. The circuits for operating heads 58, 60, and 62 are omitted since they are conventional and are not essential for comprehension of the present invention.

Figure 2:
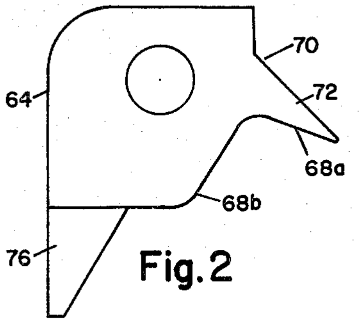
FIG. 2 is a plan view of an enlarged scale of a locking element forming part of the apparatus of FIG. 1.

It is to be observed that the various guide rolls 16, 18, 20, 24, 28, and 32, plus the rollers 40 and 42, have U-shaped, flat-bottom, peripheral grooves just wide enough to accommodate the leader and any tape connected thereto, whereby to prevent the leader and the tape from shifting up or down relative to top wall 2 of the tape bed. Cooperating with the groove of guide roll 32 to effect locking of leader L is a locking element 64 which is pivotally secured at 66 to the top wall 2. As seen best in FIG. 2, locking element 64 includes an angular surface consisting of two parts 68*a* and 68*b* which define a rounded, substantially 90-degree corner. The locking element is cut back as shown at 70 whereby to form a finger portion 72 which can be disposed between guide rolls 28 and 32 so that the angular surface 68*a*, *b* can lie within the groove of guide roll 32. A leaf spring 74 attached to top wall 2 bears against locking element 64 to press finger 72 against guide roll 32. The locking element also has a projecting finger 76 of reduced thickness which extends almost at right angles to finger 72. Finger 76 is shaped to fit within a recess 78 formed in the underside of a lug 82 on a tape cartridge 84.

Figure 3:
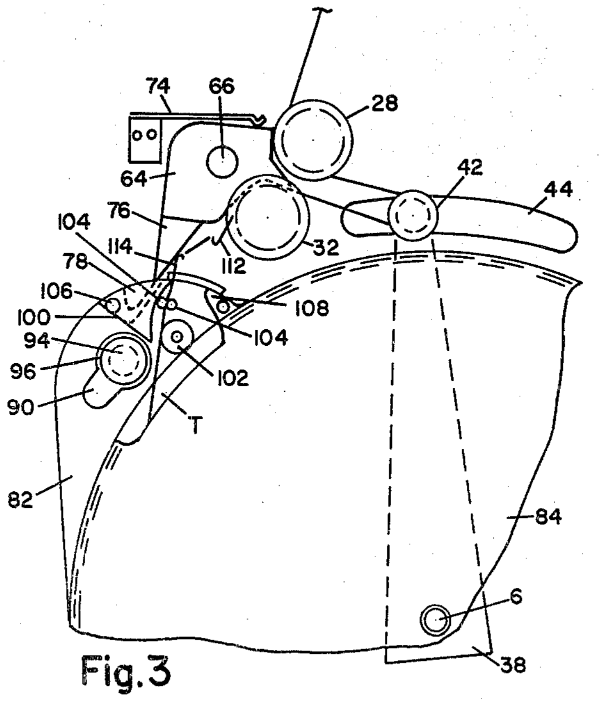
FIG. 3 is an enlargement of a portion of FIG. 1 showing the tape cartridge in the first of two predetermined positions.
Figure 4:
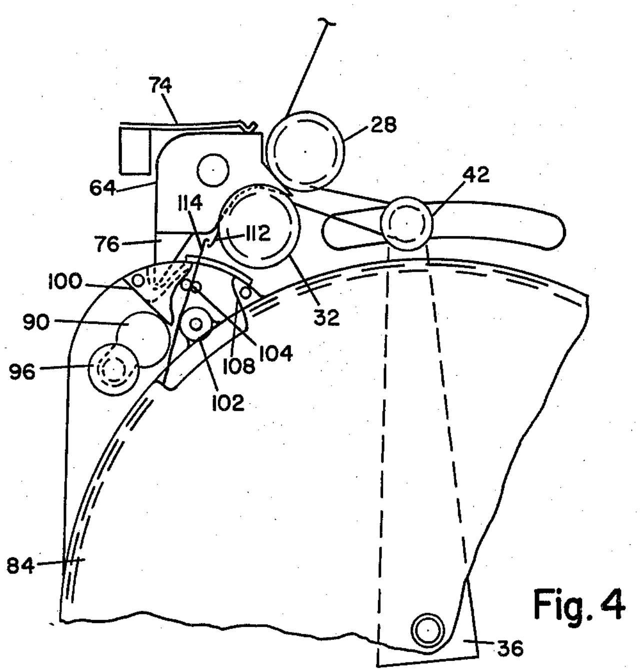
FIG. 4 is a view similar to FIG. 3 but with the tape cartridge in the second of said two positions.

In addition to lug 82, cartridge 84 has two additional lugs 86 and 88, the three lugs arranged as shown in FIG. 1. Each lug is provided with a bayonet slot 90. These slots are sized to accept and lock with studs 94 attached to the top wall of tape bed 1. Each stud has an enlarged head 96 which is small enough to pass through one end of a bayonet slot 90 but too large to pass through the other end of the same bayonet slot. As a consequence, the studs 94 determine two positions for the tape cartridge. One position is shown in FIG. 3 where the stud heads are in registration with the larger portions of the bayonet slots. The second position is shown in FIG. 4 where the heads of the studs are in registration with the smaller portions of the bayonet slots. When the cartridge is in the position of FIG. 3, it may be lifted on or off of the bed and the locking elements 64 is pressing against guide roll 32. When the cartridge is in the position of FIG. 4, it holds locking element 64 out of engagement with guide roll 32 and is itself frictionally locked to the bed. In this connection, it is to be observed that the heads 96 of studs 94 are spaced from the top wall 2 by an amount approximately the same as the thickness of lugs 82, 86, and 84 in the regions of the slots 90, as a result of which the heads 96 will frictionally grip the upper surfaces of the lugs when the cartridge is shifted to the position of FIG. 4. The gripping force will be sufficient to hold the cartridge in place but insufficient to resist manual rotation of the cartridge to the position of FIG. 3.

Mounted on the upper side of the lug 82 and captivated between the lug and a returning plate 100 is a single, relatively large guide roll 102 and a pair of relatively small guide rolls 104. The plate 100 is held in place by screws 106 which screw into tapped holes in two bases 108 formed integral with lug 82. The guide rolls 102 and 104 serve to guide tape T as it is withdrawn from the cartridge 84. Guide rolls 104 serve an additional function described hereinafter.

Figure 5:
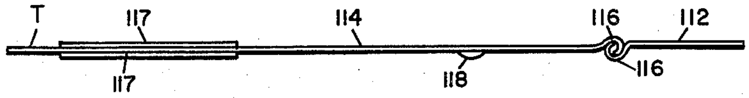
FIG. 5 is a fragmentary side view of two coupling elements constructed according to the present invention.
Figure 6:
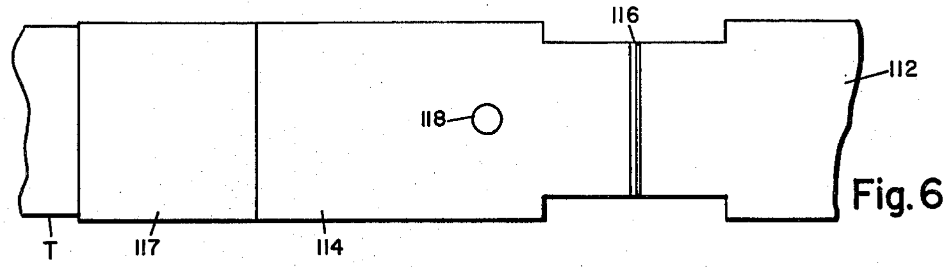
FIG. 6 is a plan view of the elements shown in FIG. 5.
Figure 7:
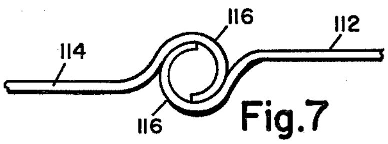
FIG. 7 is a fragmentary view on an enlarged scale of the hooked ends of two complementary coupling elements.

Turning now to FIGS. 5, 6, and 7, it is to be understood that the invention involves the use of complementary coupling elements 112 and 114 for causing the tape T to be threaded automatically after the cartridge has been inserted on the spindle 6. The coupling elements 112 and 114 each have a hook 116 at one end and are made from a flat ribbon of a suitable spring metal such a beryllium copper. Preferably, the ribbon stock has a thickness of approximately .002 inch, and its width is substantially the same as the tape and the tape leader. In practice, the overall length of each coupling element is in the order of 1 to 2 inches. As shown in FIG. 3, coupling element 112 is connected to the free end of the leader L, and coupling element 114 is connected to the free end of the tape T. It has been determined that the hooks formed on the ends of these coupling elements must have a small, relatively constant diameter. The circular curvature of the hooked ends is shown in FIG. 7. Preferably, the inside diameter of the hook is in the order of .008–.012 inch, with the center of curvature offset to one side of the plane of the ribbon stock by a fraction, e.g., .005 inch, of the aforesaid inside diameter. If the hooked ends are not of substantially circular curvature but are U-shaped, the coupling elements will not make a good hinge connection, i.e., they will not rotate well relative to each other as they move around the various guide rolls, whereby they will not stand up under repeated use. The coupling elements may be attached to the leader tape in various ways, the preferred mode of attachment being by a pair of connecting strips of plastic tape 117 secured thereto by a strong adhesive, e.g., an epoxy cement. Although the two coupling elements are identical in size and shape, coupling element 114 has one feature which is lacking from the coupling element 112. This additional feature is a bead of solder or a dimpled indentation 118 which is located a short distance, e.g., 0.4 inch, from the hooked end 116. The purpose of the protrusion is to prevent the coupling element 114 from being withdrawn into the interior of cartridge 84. The protrusion is of sufficient size to prevent it from passing between the two guide rolls 104. The spacing of the latter is very close, being only a few thousandth greater than the thickness of the coupling element 114. The overall thickness of the protrusion should not be excessive; otherwise it might impede movement of coupling element 114 over and around various guide rolls. A maximum bead thickness of approximately 0.040 inch will yield satisfactory results. It is to be observed that the bead does not affect the quality of the recording or playback since it is located on the side of coupling elements 114 which does not contact the magnetic heads 58 and 60.

In contradistinction to conventional plastic magnetic tape, the inherent resiliency and strength of the material of which they are made prevent coupling elements 112 and 114 from exhibiting any torsional sag, i.e., twist, when held at or near one end only. Accordingly, the constraining effect of the guide rolls 104 causes (1) the hooked end of coupling element 114 to be disposed at a particular angle relative to spindle 6 when the protrusion 118 is located at the guide rolls 104 and (2) the plane of the coupling element to be disposed at right angles to the plane of the top wall 2 of the tape bed. The same physical characteristics cause the other coupling element 112 to reside with its plane at the same angle with respect to the tape bed 2. Moreover, because of the cooperative channeling effect produced by the guide roll 32 and the adjacent angular surface 68*a*, *b* of locking element 64 when its finger 72 is pressing it against guide roll 32, the free end of coupling element 112 also will assume a predetermined angle with respect to the spindle 6. In this connection, it is to be appreciated that leaf spring 74 exerts force on locking element 64 sufficient for finger 72 to hold coupling element 112 stationary against roller 32 when the cartridge is in the position of FIG. 3 where it does not press against finger 76.

The length of the coupling elements 112 and 114 and the particular angular orientation of the free hook ends of these couplings is such that when coupling element 112 is located in a predetermined position (FIG. 3), the other coupling element 114 will be positioned to one side of and slightly short of the hooked end 116 of the coupling element 112. However, when the cartridge 84 is rotated into its second position (FIG. 4), the hook on the end of the coupling element 114 will be behind and in the path of the hook on the end of coupling element 112. Therefore, on commencement or recording or playback, leader coupling element 112 will automatically hook onto the coupling element 114, causing the tape T to be withdrawn from the cartridge 84. If, after completion of the recording or playback operation, the tape is rewound in the cartridge 84 and the movement of the leader is stopped just after the protrusion 118 engages guide rolls 104 so that coupling element 112 will be in the same position as it was originally, the cartridge 84 may be removed by simply rotating it to the position shown in FIG. 3 and lifting it off to the tape bed. This rotational movement will allow spring 74 to cause locking element 64 to press coupling element 112 tight against guide roll 32, thereby preventing it from being moved under the influence of roller 42. Coupling element 112 will yield and bend when the cartridge is turned to unlocked position. When the cartridge is lifted, coupling element 114 will disengage itself from coupling element 112 and the latter will unbend and return to its normal position (FIG. 3). If a new cartridge is reinserted onto the tape bed and turned to the locked position shown in FIG. 4, the hook on its coupling element 114 will automatically assume the proper position to be engaged by the complementary hook on the coupling element 112 when the leader is caused to be transported in the direction of storage reel 10.

Figure 8:
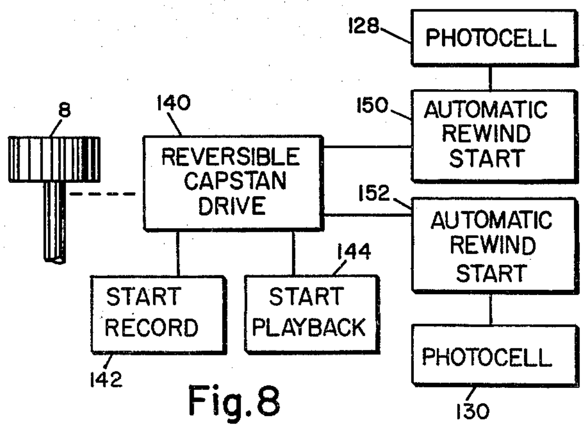
FIG. 8 is a schematic diagram of certain components of a tape recorder embodying the present invention.

FIG. 1, together with FIG. 8, illustrates means for automatically rewinding the tape and for stopping the leader L with its coupling element in the position shown in FIG. 3. This automatic rewind system comprises two photoelectric systems comprising two light sources 124 and 126 and photocells 128 and 130, respectively. These two systems are spaced apart and are situated so that leader L and tape T will pass between the light sources and their respective photocells. Since the coupling elements 112 and 114 are metal and, therefore, opaque, and since the magnetic tape T and its leader L are of substantially opaque character also (the tape having poor light transmitting quality because of its iron oxide coating), normally no light will pass from the light sources to their associated photocells. However, light may be permitted to pass at appropriate intervals by providing light transmitting areas in the tape and also in the leader. In the case of the tape, this can be achieved by scratching a line in the iron oxide coating, the line functioning as a slit through which light may pass. In the case of the leader, the same result can be achieved by a pinhole or razor slit (or by scratching if the leader is a section of magnetic tape or is a transparent tape having an opaque coating). One light transmitting area is provided a short distance from the end of the leader which is attached to storage reel 10, and the other is provided a short distance from the tail end of the tape which is attached to the hub of the cartridge. The light transmitting areas are located such that appropriate control means can cause the rewinding to be terminated automatically at exactly the right point when the light transmitting area on the leader passes between the light source 124 and photocell 128 and the rewinding to start automatically when the light transmitting area on the tail end of tape T passes between the light source 126 and the photocell 130. Automatic rewinding of tape T is accomplished by the system of FIG. 8. This system comprises a reversible drive 140 for capstan 8, a manual start record switch 142, a manual start playback switch 144, an automatic rewind control unit 146 which operates in response to photocell 130, and an automatic stop rewind control unit 148 which operates in response to photocell 128. As is customary, drive 140 will move the tape forward at a relatively slow speed suitable for recording and/or playback and will move the tape in the reverse direction at relatively high speed for fast rewinding. In the case of a single information channel, the automatic rewind system will cause the tape to rewind once and then stop in position for removal of the cartridge in the manner previously described. Although not shown, the automatic rewind system also may be adapted to shut down the entire electrical system of the recorder after completion of the rewind cycle. In the case where the magnetic heads can process a plurality of information channels, the automatic rewind system may be supplemented by means for causing the capstan drive 40 to drive the capstan forward again after each rewinding until all channels have been covered, with the drive terminating operation after completion of the final rewinding cycle.

It is believed to be apparent from the foregoing description and the accompanying drawings that the present invention is relatively simple, yet constitutes a meritorious advance in the art of tape transports. The essential advantage of the invention is that a tape may be introduced to and run through a taper recorder without the operator ever touching the tape or accomplishing any other action except the insertion and rotation of the magazine. Reliability of the self-threading system is exceptionally good, and this is due in part to the fact that actual coupling of the two coupling elements does not occur until the leader has started to wind up on the storage reel. The guide rolls 104 on the cartridge and the locking element 64 and the accompanying guide roll 32 on the tape bed successfully and dependably position the ends of the coupling elements so that when the cartridge is rotated from the position shown in FIG. 3 to the position shown in FIG. 4, the hooked ends of the coupling elements will be in position to engage each other immediately after the leader has commenced moving toward the rewind reel. Positioning of the hooked end of the coupling element 114 is automatic due to the fact that the studs 94 and the bayonet slots 90 automatically determine the second position of the cartridge.

Although not shown, it is to be understood that the switches 142 and 144 need not be manually operated switches but may be made so as to be actuated by the cartridge itself as it is rotated to its second lock position. This variation is suitable where the tape transport is to be used solely for recording purposes or solely for playback purposes. In the same manner, the cartridge may be used to actuate an on-off power switch when it is moved from its first unlock position to its second lock position, whereby the recorder will be off so long as the cartridge is in its first position or no cartridge is mounted on the spindle 6, and will be turned on automatically when a cartridge on spindle 6 is rotated to its second position.

Obviously, many other modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

We claim:

1. A magnetic tape recorder comprising a magnetic head, a spindle for a magnetic tape cartridge, a magnetic tape cartridge of the type including a structure which is fixed against continued rotation when tape is withdrawn therefrom or wound thereon, a storage reel, a flexible resilient leader attached at one end to said storage reel, the opposite end of said leader having a tape coupling element attached thereto, said tape coupling element having a hook at a free end thereof, means for transporting said leader back and forth between said storage reel and a position proximate to said fixed cartridge structure, means for stopping said leader transporting means automatically when the coupling element on said leader reaches said predetermined position proximate to said structure, means releasably locking said coupling element at said predetermined proximate position at a predetermined angle relative to said tape cartridge structure, cartridge positioning means located adjacent to said spindle for holding said cartridge on said spindle and determining first and second distinct positions between which said fixed cartridge structure may be rotated while said cartridge is on said spindle, in said first position a complementary coupling element on the free end of the tape on said cartridge being located to one side and short of the hooked end on said leader coupling element, in the second position the coupling element of said cartridge being located in the path followed by the hooked end of the coupling element on said leader as said leader coupling element is drawn toward said storage reel, and operating means including control means on said fixed cartridge structure, and operating means causing said locking means to move to a locking position when said cartridge is in said first position and to a release position when said cartridge is in said second position, whereby when said fixed cartridge structure is in said second position and said leader is moved in the direction of said storage reel its coupling element will hook onto said complementary coupling element so as to draw tape from said cartridge past said head to said storage reel.

2. A tape recorder as defined by claim 1 wherein said locking means is a pivotal element having a first surface arranged to engage said leader coupling element and a second surface arranged for engagement by said control means, said control means comprising a second surface on said fixed cartridge structure, said first surface of said pivotal element being moved into and out of engagement with said leader coupling element by movement of said second surface resulting from said rotational movement of said fixed cartridge structure between said first and second positions.

3. A tape recorder as defined by claim 2 further including a guide roll against which said leader coupling element is positioned and held at said angle by force exerted by said pivotal locking element against said guide roll.

4. A tape recorder as defined by claim 1 wherein said hook has a constant, relatively small radius of curvature.

5. The tape recorder claimed in claim 1 wherein said hook describes an arc which extends through an angle in excess of 180 degrees about an axis parallel to the plane of said tape and extending transverse to the direction of travel of said tape, said hook having a uniform material thickness throughout, the inside diameter of said hook being in the range of .008 to .012 inch.

6. The tape recorder claimed in claim 5 wherein the opening in said hook faces in a direction generally away from said cartridge, said complementary coupling element having a hooked end having a configuration identical to said hook, with an opening facing generally toward said cartridge, whereby interconnection of said hook and said hooked end provides a hinge connection between said tape leader and said tape.

7. In a self-threading tape transport system comprising, in combination, a tape storage reel, a tape leader having one end attached to said storage reel and another end secured to a first coupling element, said coupling element being formed of resilient material and having a first hook at the free end thereof, said hook describing an arc which extends through an angle in excess of 180 degrees about an axis parallel to the plane of said tape and transverse to the direction of travel of said tape, said hook having a uniform material thickness throughout, the inside diameter of said hook being in the range of 0.008 to 0.012 inch, a tape cartridge, a spindle upon which said cartridge is mounted for limited rotation, means defining a path for said leader from said storage reel to a region proximate said cartridge, locking means for releasably holding said coupling element at a predetermined angular relationship to said cartridge, a second coupling element projecting from said cartridge and having a second hook identical to said first hook, thereby to provide hingelike relative rotation of said hooks when they are interengaged, said spindle being so located that said limited rotation of said cartridge on it brings said first and second hooks into intercept relationship so that movement of said first coupling element toward said storage reel results in interengagement of said hooks.

8. The system claimed in claim 7 wherein the opening in said first hook faces in a direction generally away from said cartridge while the opening in said second hook faces in a direction generally toward said cartridge.

References Cited by the Examiner

UNITED STATES PATENTS

| | | | |
|---|---|---|---|
| 1,685,010 | 9/28 | Thornton | 242—71.1 |
| 2,005,738 | 6/35 | Foster et al. | 242—55.11 |
| 2,745,604 | 5/56 | Masterson | 242—55.12 |
| 2,952,416 | 9/60 | Sampson | 242—55.12 |
| 2,963,940 | 12/60 | Raabe | 242—71.2 X |
| 2,964,593 | 12/60 | Kleve | 179—100.2 |
| 3,025,011 | 3/62 | Camras | 242—55.13 |

FOREIGN PATENTS 716,632 10/54 Great Britain.

MERVIN, STEIN, *Primary Examiner.*

HARRISON R. MOSELEY, *Examiner.*

UNITED STATES PATENT OFFICE

CERTIFICATE OF CORRECTION

Patent No. 3,190,575 June 22, 1965

Paul F. Hayner et al.

It is hereby certified that error appears in the above numbered patent requiring correction and that the said Letters Patent should read as corrected below.

Column 7, line 25, for "and" read -- said --.

Signed and sealed this 7th day of June 1966.

(SEAL)
Attest:

ERNEST W. SWIDER
Attesting Officer

EDWARD J. BRENNER
Commissioner of Patents